A. T. PRESCOTT.
BEARING.
APPLICATION FILED APR. 13, 1910.
1,012,153.
Patented Dec. 19, 1911.
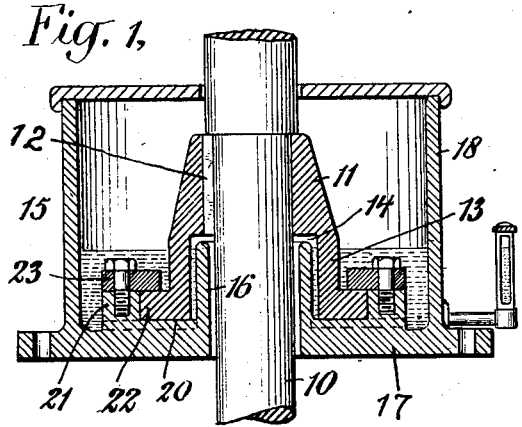
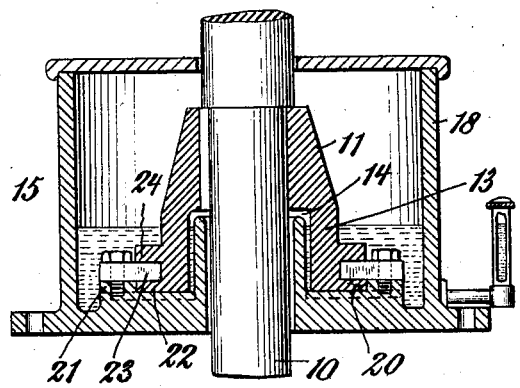
WITNESSES:
INVENTOR
ATTORNEYS

UNITED STATES PATENT OFFICE.

ARTHUR T. PRESCOTT, OF EAST ORANGE, NEW JERSEY, ASSIGNOR TO GEORGE H. FROTHINGHAM CO., A CORPORATION OF NEW YORK.

BEARING.

1,012,153.  Specification of Letters Patent. Patented Dec. 19, 1911.

Application filed April 13, 1910. Serial No. 555,201.

*To all whom it may concern:*

Be it known that I, ARTHUR T. PRESCOTT, a citizen of the United States of America, and a resident of East Orange, county of Essex, and State of New Jersey, have invented certain new and useful Improvements in Bearings, of which the following is a specification, reference being had to the accompanying drawings, forming a part thereof.

My invention relates to improvements in bearings, and particularly to radial and thrust bearings for vertical shafts, and the main objects of my invention are to improve this form of bearing and to provide for the thorough lubrication of the bearing surfaces therein.

In practice great difficulty has been experienced in thoroughly lubricating a vertical shaft bearing and particularly one employing opposed end thrust bearing surfaces for resisting longitudinal movements of the shaft in both directions, because of the difficulty of retaining the lubricating material between the bearing surfaces, and especially between those surfaces which resist upward movement of the shaft.

In carrying out my invention I employ a housing of annular form which surrounds the shaft and which constitutes an oil reservoir, and I provide the shaft with a portion secured thereto having a downwardly projecting sleeve which extends into the oil reservoir, and which is provided with upper and lower bearing surfaces for engagement with coacting bearing surfaces carried by the said bearing, all of which are arranged at a point within the said oil reservoir, and by this means I am enabled to thoroughly lubricate the bearing surfaces even to the extent, if desired, of continuously flooding them, while at the same time retaining the oil against escape along the shaft.

In order that my invention may be thoroughly understood, I will now proceed to describe certain embodiments thereof, having reference to the accompanying drawings illustrating the same, and will then point out the novel features in claims.

In the drawings: Figure 1 is a view in central vertical section through a vertical shaft bearing constructed in accordance with my invention. Fig. 2 is a similar view of a bearing of the same type but of slightly modified form.

Referring first of all to the construction of Fig. 1, the shaft 10 therein is provided with a collar 11 secured fast thereto as by a key 12, the said collar being provided with a dependent annular sleeve 13 disposed concentric with the shaft 10, but spaced therefrom so that an annular chamber 14 is formed between the said sleeve and the shaft 10. A housing 15 surrounds the said shaft, the said housing being provided with an uprising sleeve portion 16, the upper end of which is received within the annular chamber 14 between the collar 13 and the shaft 10, a suitable base 17 and an exterior annular wall 18. The annular space inclosed between the sleeve 16 and the wall 18 constitutes an oil chamber which may receive and will retain oil up to the level of the upper edge of the said sleeve 16. The lower end of the collar 13 is provided with an annular flange 22, the lower surface of which finds a bearing upon a complementary bearing surface 20 upon the housing base 17 and the periphery of which bears against the inner surface of an uprising flange or ring 21 with which the said base is provided. A ring or cover plate 23 surmounts the said flange 21, being suitably bolted thereto as shown, the inner portion of the said ring or cover plate overhanging the said flange 21 and engaging the upper surface of the collar flange 22. The co-acting bearing surfaces between the element 23 and the flange 22 constitute a thrust bearing which will oppose upward movement of the shaft 10, while the co-acting bearing surfaces between the housing base and the flange 22 constitute a thrust bearing for resisting downward movement of the shaft. Radial movement of the shaft is, of course, opposed by the radial bearing between the periphery of the flange 22 and the inner surface of the uprising flange or ring 21 as will be well understood. All these bearing surfaces are disposed within the oil chamber aforesaid so that they may be maintained in a continuously flooded condition, the said sleeve 16 acting to prevent the oil contained in the reservoir from escaping along the shaft.

The construction of Fig. 2 is similar to that of Fig. 1 except that the collar sleeve is provided with a second flange 24, and the inner edge of the cover plate 23, which in this case will of course be of sectional form to permit of the assemblage of the parts, engages a portion of the sleeve above the sleeve flange 22. This constitutes a double thrust bearing which has two sets of bearing surfaces for opposing thrust in either direction, and it will be of course understood that such bearing surfaces may be duplicated as may be desired to any reasonable extent. This form of bearing is suitable for the stems of heavy gate and sluice valves, and other apparatus in which the thrust is sometimes in one direction and sometimes in the other.

What I claim is:

1. A vertical shaft, a collar affixed thereto having a downwardly projecting sleeve portion which is spaced from the shaft, the lower end of said sleeve portion being constructed to form a radial bearing surface and two horizontal thrust bearing surfaces in different planes; a housing surrounding the shaft and collar provided with an upwardly projecting sleeve which is received between the collar sleeve and the shaft and which constitutes the inner wall of an oil chamber contained within the housing, the said housing forming a horizontal bearing surface for the lower thrust bearing surface of the collar and an annular bearing surface for said radial bearing surface, and a separate member affixed to the housing having a bearing surface for the upper thrust bearing surface of the collar, below the upper end of said upwardly projecting sleeve.

2. A vertical shaft, a collar affixed thereto having a downwardly projecting sleeve portion which is spaced from the shaft, the lower end of said collar sleeve being provided with an outwardly projecting flange, the bottom of which forms a flat horizontal thrust bearing surface, the top of which forms another flat thrust bearing surface, and the outer periphery of which forms a radial bearing surface, a housing surrounding the shaft and collar provided with an upwardly projecting sleeve which is received between the collar sleeve and the shaft and which constitutes the inner wall of an oil chamber contained within the housing, the bottom of said housing forming a flat horizontal bearing surface of the collar flange, and an annular bearing surface for said radial bearing surface, and a separate member affixed to the housing having a bearing surface for the upper thrust bearing surface of the collar flange below the upper end of said upwardly projecting sleeve whereby all of said bearing surfaces may be submerged in oil.

ARTHUR T. PRESCOTT.

Witnesses:
D. ENID DEUTSCH,
HORATIO O'KEEFE.